June 24, 1958 P. M. MUSPRATT 2,840,353
RADIANT HEATING PANEL
Filed Aug. 29, 1952 3 Sheets-Sheet 1

INVENTOR
Paul M. Muspratt
BY Stevens, Davis, Miller & Mosher
ATTORNEYS

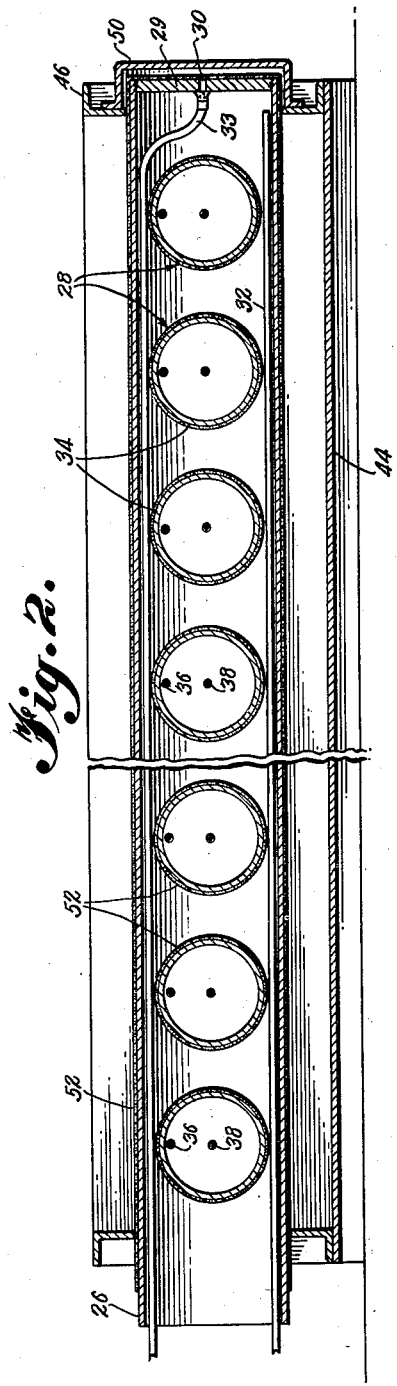
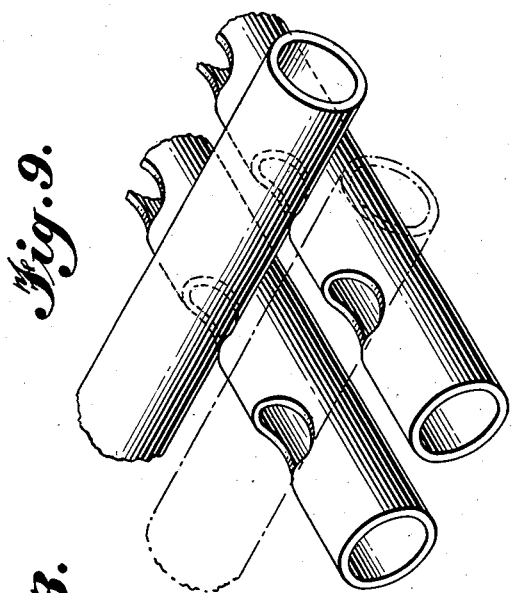
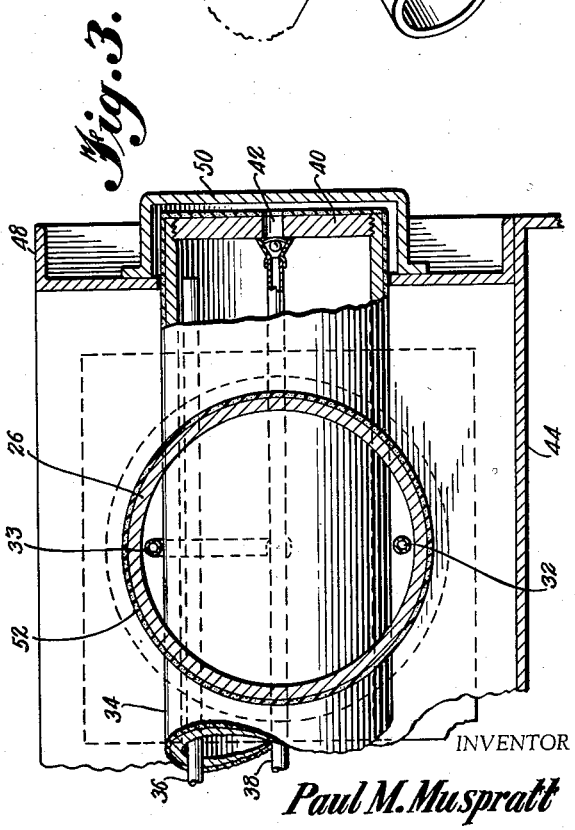
INVENTOR
Paul M. Muspratt

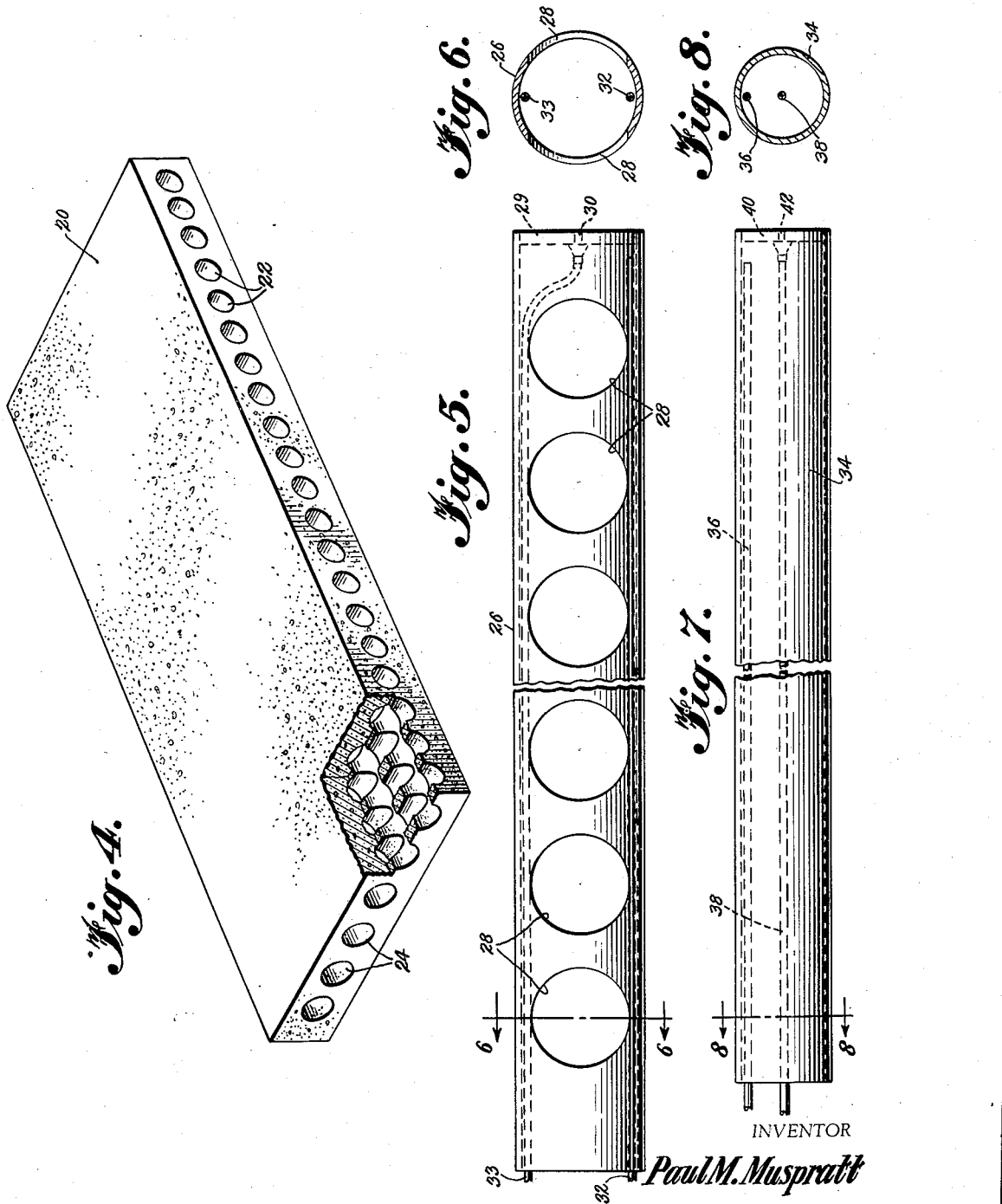

United States Patent Office 2,840,353
Patented June 24, 1958

2,840,353

RADIANT HEATING PANEL

Paul M. Muspratt, Kingston, Pa.

Application August 29, 1952, Serial No. 307,045

1 Claim. (Cl. 257—124)

This invention in a broad sense relates to the art of building construction. It is concerned with the initial construction of buildings as well as modernization of presently existing structures.

In a more specific sense, the invention contemplates building elements of a particular construction especially adapted for the distribution of heat to the interior of the building, while at the same time providing building elements of greatly reduced weight with high insulating qualities. The invention also is concerned with a method of fabricating the contemplated building elements as well as apparatus which is utilized in the method.

Radiant heating panels are of course no innovation in the art of heating at this stage in the development of the art. The common type of panel is provided with internally extending metal pipes or tubes which are connected to a source of heat, generally steam or hot water. In some cases electrical heating is provided by the incorporation of electrical resistance elements into the body of the panel. The general idea of heating by radiant panels is widely and well accepted as a very desirable heating method. However, primarily because of the expense in connection with the fabrication of these panels, their use in modern construction is not extensive. The expense arises primarily because of the fact that the necessary pipes and tubes which carry the heating medium make them inordinately costly. Electrical heating panels present a similar obstacle. These panels also have other disadvantages in that there is the danger of leakage of the heat transfer medium which necessitates costly repairs to the structure using it, and additionally, care must be taken to insure that freezing of the liquid medium in pipes does not occur when heat is not being supplied to them.

The present invention seeks to overcome the difficulties encountered by the prior art devices.

It is an object of the present invention to provide a structural building element which shall be especially suitable for use as a radiant heating and insulating panel wherein the necessity for added internal tubular elements is avoided. So far as is known, no building element has been suggested by the art which includes the provision of an inner connecting network of communicating ducts that are necessary for highly efficient heat exchange uniformly throughout the surface of a panel. Building elements exist that are internally cored in one direction; but, as will be seen, the present invention seeks to improve upon such panels. The art has not suggested a method by which an element, such as a panel, can be internally cored so as to accomplish the desired result, the difficulty arising because heretofore the ducts or cores could not be made intercommunicating one with the other without leaving metal tubes or tubes of other material in place.

It is a further object of this invention to provide an element of the character indicated which will afford the necessary strength and which may be fabricated economically.

It is the further object of this invention to provide a rapid and economical method for manufacturing the elements contemplated by the present invention.

Still another object of the invention is to provide a coring vessel which is easily removable from the interior of a set plastic mass and which will form cores therein each communicating with the other.

Other objects of the invention will become apparent as the description proceeds.

Referring to the drawings, Figure 1 is a plan view illustrating an assembly of interfitting vessels. The vessels as can be observed are associated in a box-like structure.

Figure 2 is a view in elevation of Figure 1 taken on the line 2—2 thereof.

Figure 3 is a view in elevation of a portion of Figure 1 showing a corner assembly partially in section and broken away.

Figure 4 is a perspective view of an embodiment of a structural member of this invention, a portion thereof being broken away, to illustrate the arrangement of internal ducts.

Figure 5 illustrates a component of the vessel which is indicated in Figure 1.

Figure 6 is a sectional view taken on the line 6—6 of Figure 5.

Figure 7 is a vessel element which co-operates with the element illustrated in Figures 5 and 6.

Figure 8 is a view in section of Figure 7 taken on the line 8—8.

Figure 9 illustrates a modified form of vessel element.

Figure 1:
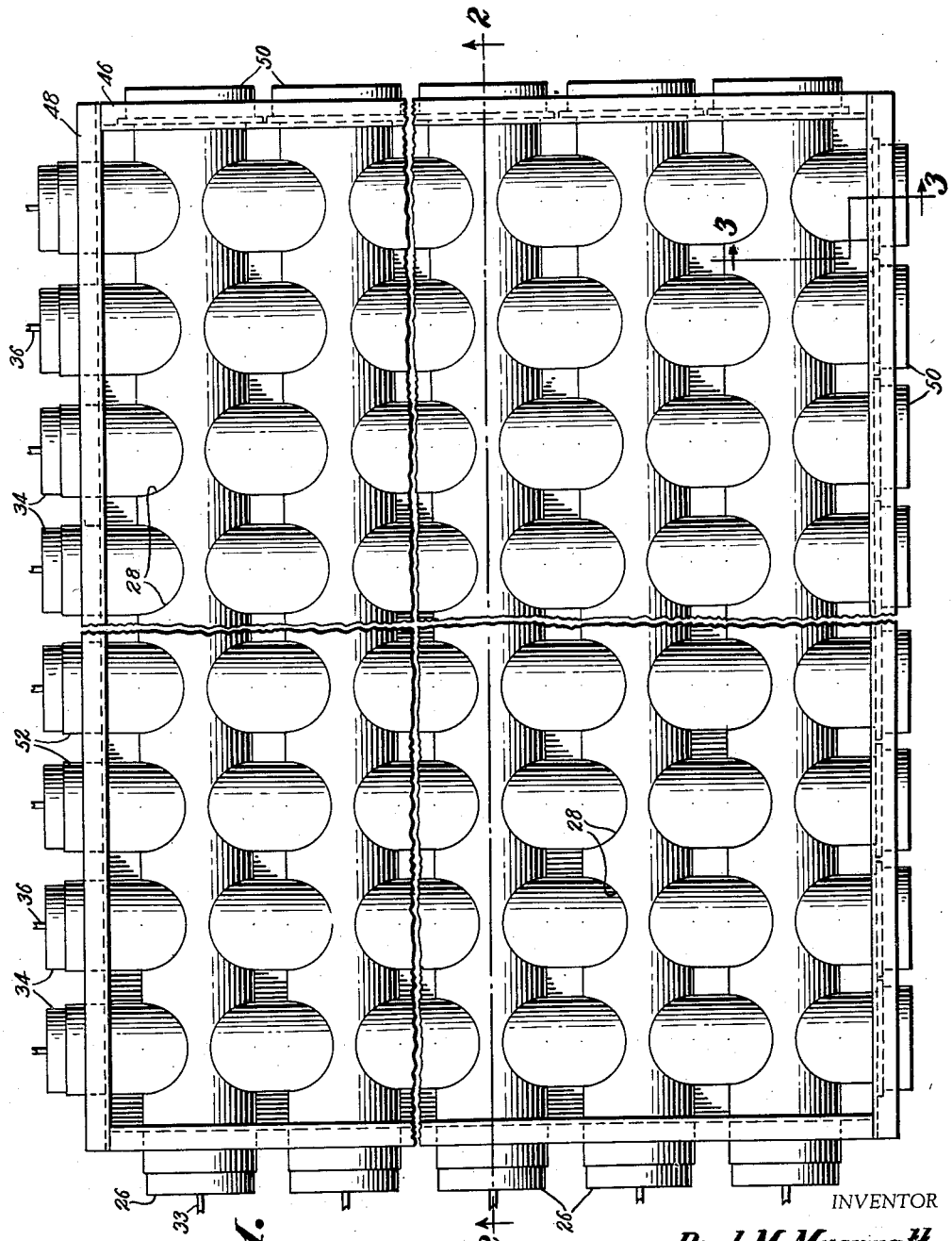

Referring to Figure 4 of the drawings, numeral 20 denotes a panel constructed in accordance with the teachings of this invention. Numeral 22 denotes internal passageways, ducts or cores extending laterally on the panel and numeral 24 denotes internal passageways extending longitudinally. In the embodiment shown in Figure 4, the internal passageways, or cores as they are hereinafter referred to, lie in a common horizontal plane and each core intersects the other at right angles. Panel 20 is entirely without added internal pipes, the cores being formed in the body of the panel itself. This panel is fabricated from a single material and is of entirely one piece construction. It will be observed that the cores lie in a plane nearer the top surface of the panel than the bottom for the reason that the invention contemplates in the preferred form that only one side of the panel will serve as a heat source in use.

So far as is known no method exists in the prior art by which the panel as described above may be fabricated. The present invention provides a new and novel method together with the necessary apparatus for forming building elements such as illustrated by Figure 4 and described above. A formed product may take many forms and shapes. Consequently, for the sake of simplicity, and in illustrating the invention, the method and apparatus will hereinafter be detailed in terms of the formation of a building panel such as shown in Figure 4.

Referring to Figures 5 and 6, there is illustrated a vessel element 26. The length and diameter of this element is not critical, such dimensions being fixed by the size of the product which is desired, the necessary heat capacity, and strength factor in the panel itself. As can be readily seen, vessel element 26 takes the form of an elongated tube-like structure. Throughout the length of element 26, and at diametrically opposed points, a series of openings are formed in the wall thereof. These openings are denoted by numeral 28. One end of element 26 is closed as indicated by numeral 29, and in this closure, as will be described at greater length hereinafter, there is provided a valve, indicated by numeral 30. On the interior of element 26, and along its upper surface as best seen in Figure 3, there is illustrated somewhat schematically a heating element denoted by numeral 32 and a tube for compressed air denoted by numeral 33, the purposes of which will be further elaborated upon. Reference to Figure 1 of the drawing at this point will illustrate the position of elements 26 in the assembly.

The description now proceeds with a discussion of Figures 7 and 8.

Figures 7 and 8 illustrate a second tube-like vessel element denoted by numeral 34. This element is of slightly less diameter than element 26 so that in use it may be passed through openings 28 of elements 26. The assembly of a plurality of elements 26 and 34 forms a lattice-like structure, a plan view of which is shown in Figure 1. In element 34, similarly as in element 26, there is provided a heater element denoted by numeral 36 and a tube for carrying compressed air, the tube being indicated by numeral 38. One end of element 34 is closed as indicated at numeral 40 in which closure there is located a valve denoted by numeral 42. The detail of the closure valves as well as their connections to the source of compressed air is more fully illustrated in Figure 3.

Referring now to Figures 1 and 2, there is illustrated a box-like structure composed of sidewalls and endwalls which structure in practice is seated upon a pallet, the pallet being illustrated in Figure 2 and denoted by numeral 44. The walls of the box-like structure which are denoted by numerals 46 and 48 are provided with a series of openings through which vessel elements 26 and 34 may be passed and supported. For reasons that will appear a little later, openings in adjacent sidewalls are provided with caps denoted by numeral 50. In assembling the box-like structure with the vessel elements, vessel elements 26 are first inserted through the unobstructed openings in the wall 46 and passed through to a point where the closed end of each vessel element 26 rests within the cap structure of the cap elements 50. At this point openings 28 in vessel elements 26 correspond with the opening in the sidewall 48. Vessel elements 34 are then passed through the openings in sidewall 48, then through openings 28 in vessel elements 26 to a point where the closed end of vessel elements 26 rests within caps 50.

With vessel elements 26 and 34 in place, a plastic mass, for example concrete, is poured in the box around the vessel elements and processed in any desired manner. After the mass has set, vessel elements 26 and 34 are withdrawn, leaving the formed product completely honeycombed with intercommunicating ducts as described previously in connection with panel 20.

The foregoing, in a general way, describes important aspects of the basic scheme of the invention. However, in order to facilitate the workings of the basic idea and render it wholly feasible and practical, there are additional desirable aspects of the invention which require explanation. These aspects have to do in the most part with ease of removal of vessel elements 26 and 34. It will be understood by those skilled in the art that if no special means is provided for the withdrawal of elements 26 and 34, the task would be almost an impossible one in a practical sense.

In order that the withdrawal of these elements may be performed, each of elements 26 and 34 prior to assembly in the form illustrated in Figure 1 is provided with an outer sheath denoted by numeral 52. The sheath is not illustrated in the drawing except in Figure 1 as it will be generally understood to conform to the configuration in all respects of vessel elements 26 and 34 except that no end closure element is provided, both ends being open. Sheath elements 52 are preformed structures which may be of many compositions but which basically are composed of low melting point materials such as a combination of paraffin wax and bituminous material. The melting point of such compositions preferably should not exceed about 150° F. The low melting point material may be deposited on a great variety of bases for giving it support and shape, for example, cheesecloth, paper, jute and the like. The sheaths need not have walls of great thickness, it being contemplated that a thickness of $\frac{1}{64}$ to $\frac{1}{32}$ of an inch will suffice.

When it is desired to withdraw vessel elements 26 and 34 heat is supplied to the interior of vessel elements 26 and 34, which heat serves to soften the sheath material, thus providing a lubricating agent which facilitates their withdrawal.

It will be understood by those skilled in the art that the pressure resulting by reason of the expansion of the concrete on elements 26 and 34 is of considerable magnitude, and that even though these elements will be withdrawn on a lubricated surface, the withdrawal problem is not completely solved. In order to provide a permanent free space between vessel elements 26 and 34 and the mass of concrete, it is desirable to remove at least a portion of the melted sheath material. This is accomplished in the following manner.

As indicated previously, the closed end of elements 26 and 34 extend to a point within cap number 50 as can be seen in Figure 3. Also a source of compressed air is connected to a valve element which opens into the space between the closure cap of elements 26 and 34 and the outside cap 50. When the heat has sufficiently melted the sheathing material, air is introduced into the space immediately adjacent to cap 50. The action of the air is not immediate upon the closure elements in vessel elements 26 and 34, as these elements are still quite firmly held by the viscosity of the melted substance. This being the case, the pressure is diverted to act upon the melted mass itself and it is expelled from the point immediately adjacent to the opposite end of vessel elements 26 and 34. When this material ejecting action has proceeded sufficiently, holding pressures on elements 26 and 34 will have been sufficiently reduced to allow the compressed air to act upon the closed ends of elements 26 and 34 and cause them to move outwardly. At this time elements 26 and 34 can be withdrawn.

It will be understood, of course, that means other than that which has just been described may be provided for effecting the release of the vessel element from the grip of the expanded concrete. It is, therefore, to be noted that the invention herein described is not to be limited by any particular means of withdrawal, the purpose of the specific description being to afford those interested in the art the advantage of a simple practical means as made known by this invention. For example, it is conceivable that in the production of certain types of formed products a heavy lubricant applied to the vessel element 34 would provide the necessary means of release. However, in products which are formed by vibratory methods, the forces thus caused to be developed within the concrete bearing upon the vessel elements 26 and 34, such a method is not suitable, as the lubricant is displaced from its contact with the vessel elements and is floated to the surface of the concrete itself.

It should be noted that super-heated stem may be employed for simultaneously heating the vessel elements and supplying the desired pressure to effect the ejecting action upon the vessel elements. For example, the closures for the ends of the vessel elements as illustrated herein may be positioned on their outside ends so that longitudinal chambers are formed within which to receive the steam. Obviously, the pressure may be built up within such as desired. Of course, after the first group of vessel elements is withdrawn, it will be necessary to plug the core openings which they have just vacated; otherwise it would be difficult to maintain the desired pressure.

It is important to note that other means for forming the construction elements of this invention may be practiced in lieu of the particularly described vessel elements herein. For example, it is conceivable that a construction element with communicating cores may be formed by depositing a plastic mass upon a suitably formed vessel constructed of inflammable material. When the poured mass has set, such vessel could easily be burned out by supplying combustion air interiorly of the product as the vessel burns itself out.

Instead of preforming a vessel wholly of inflammable material, the sheath itself may be partially formed or wholly formed of inflammable material and after it has performed its function it may be burned out. For example, it is contemplated that such a sheath may be formed of compressed sawdust with which may be admixed other inflammable and oxogen-supplying material; alternatively, the sawdust sheath may be formed with a plurality of longitudinally extending fuses which may be ignited and supply necessary ignition temperature for the sawdust all along the length of the sheath. Unless the sawdust itself protects the fuse sufficiently, it would be desirable that it be encased with an impermeable coating so that moisture will not prevent proper ignition.

In another form of sheath the inflammable material may be provided with an outer water-proofed paper layer and an inner paper layer. The outer layer being waterproof will protect the inflammable sheath from moisture; the inner paper sheath will facilitate its assembly with the vessel element itsself and will also protect the inflammable layer from damage.

By using either of the foregoing suggested vessel or sheath members the necessity for supplying heat to the interior of the vessel itself will be obviated, although in some instances, depending upon the degree to which the concrete has set in most instances, it may still be desirable to utilize pressure so as to remove as much of the residual sheath material as is possible, thereby lessening the difficulty of extracting the vessel.

It will, of course, be understood that the purpose of the inflammable sheath is to provide the necessary space between the vessel and the rigidified concrete so that when the sheath is burned out little difficulty will be encountered in withdrawing the vessel.

Referring to Figure 9 of the drawings, there is illustrated a modified form of vessel element with which it is possible to provide a similar building or heat-exchange element. The only difference resulting in the elements in using this form of vessel is that the axes of the cores will not lie in a common plane. It will be noted that the intersecting components of this vessel structure do not pass one within the other but rather one simply nests within a cut-out portion of the other. Consequently when the components of the vessel element are withdrawn from the plastic mass, each core will communicate with the other through the openings which are left at the points where the components cross each other. The sequence of the method steps in utilizing this form of the apparatus is identical with that heretofore described. Of course, it will be obvious that a modified form of box mold will have to be provided with the openings in the side walls thereof offset to accommodate the offsetting of the vessel components.

In the preceding paragraphs reference was made to valve elements 30 and 42. These are simple one-way valves, spring urged to remain closed to the outside ends of the vessel components until such time as pressure is supplied to the air lines. This prevents the possibility that the lines may become clogged and produce difficulty when it is desired to remove the vessel element from the body of the plastic mass.

Those skilled in the art of forming construction units of this general character will understand readily that the panels need not be restricted in size and that full size wall, floor or ceiling panels may be provided. Furthermore, it is contemplated by this invention that a series of panels may be made intercommunicating by providing connections from the cores of one to the cores of another so as to provide circulation of a heating or cooling medium completely about the space which they may be enclosing. In this arrangement it is contemplated that one of the panels will be connected to a manifold which will uniformly distribute the heat-exchange material.

Also, it will be understood that a layer of insulating material may be provided in the formed product by first pouring a lower layer of concrete, then applying the insulating material and thereafter continuing the pouring about the vessel until it is covered to the desired depth. By this invention it is possible to supply a cast building element which will meet the necessary specifications of the building codes and which will not require backing up by the usual standard masonry while at the same time not encountering the disadvantage of having excess dead weight in the structure.

It is contemplated that the preferred heat exchange medium for use in the described equipment will be air. However, no obstacle is seen to the use of any other desired heat-exchange medium where a membrane lining or other impervious coating is provided.

It may be that some protection for the sheaths of the vessel elements will be required when vibratory means is inserted into the plastic mass; otherwise the vibratory equipment may damage the sheathing members and make it impossible to withdraw a portion of the vessel element. In order to obviate this difficulty it may be necessary to provide the outer surface of the sheaths with a thin metal wrapping of the spiral type which will be readily removable when the vessel elements have been withdrawn.

The reference which has been made herein to particular forms and shapes of elements and the material suggested for composing these elements is not to be taken as restrictive upon the scope of the invention as it should be obvious that the broad concept of the invention may be applied wherever it is desired to interally core any building unit. For example, this invention may provide units that may be employed with greater facility by the manufacturers of pre-stressed concrete, in all the various forms such pre-stressed units may take. Additionally, the construction materials may be of any known plastic.

The invention is not restricted in application to the formation of elements such as panels and the like as particularly described herein; on the contrary the invention may be employed in connection with stationary building forms where it is desired to save material and avoid dead weight in the structure without loss of strength. Particularly, it is contemplated that the invention may be very advantageously applied in connection with the construction of dams and large retaining walls for whatever purpose and in the building of large wall sections where the forms are built upon the foundation for the purpose of receiving a concrete mass.

Having described the invention in specific detail it is desired to now claim the invention and to point out that it is to be limited only as indicated by the claim.

I claim:

A construction element suitable for use as a structural building element of substantially reduced weight with high insulating qualities for use as a radiant heating unit comprising a substantially rectangular concrete block having a pair of parallel faces separated from one another by a distance equal to the thickness of said block, said block having a first plurality of parallel internal bores extending longitudinally through said block with the axes of said bores lying in a first plane parallel to said faces, said block including a second plurality of parallel internal bores extending transversely through said block and intersecting said first plurality of said bores to provide communication between said first and said second plurality of bores, the axes of said second plurality of bores lying in a second plane spaced from and parallel with said first plane, said bores defining flow paths for the passage of heat-exchange medium therethrough.

References Cited in the file of this patent

UNITED STATES PATENTS

| | | |
|---|---|---|
| 400,308 | Cranmer et al. | Mar. 26, 1889 |
| 1,273,073 | Lake | July 16, 1918 |
| 1,520,840 | Murray | Dec. 30, 1924 |
| 1,770,813 | Selzer | July 15, 1930 |
| 1,818,387 | Dinzl | Aug. 11, 1931 |
| 1,884,612 | Dinzl | Oct. 25, 1932 |
| 2,315,394 | Brosius | Mar. 30, 1943 |
| 2,364,036 | MacKay et al. | Nov. 28, 1944 |
| 2,469,963 | Grosjean et al. | May 10, 1949 |
| 2,506,244 | Stopka | May 2, 1950 |
| 2,559,198 | Ogden | July 3, 1951 |
| 2,560,783 | Scott | July 17, 1951 |
| 2,584,591 | Keck | Feb. 5, 1952 |
| 2,598,279 | McKibbin | May 27, 1952 |
| 2,621,027 | Tatsch | Dec. 9, 1952 |

FOREIGN PATENTS

| | | |
|---|---|---|
| 559,872 | Great Britain | Mar. 8, 1944 |
| 498,393 | Belgium | Jan. 15, 1951 |